US012428604B2

(12) United States Patent
Xiao et al.

(10) Patent No.: US 12,428,604 B2
(45) Date of Patent: Sep. 30, 2025

(54) BIRDSTRIKE AVOIDANCE OPTICAL FLEXIBLE FILM, PREPARATION METHOD AND APPLICATION THEREOF

(71) Applicant: NALINV NANOTECHNOLOGY (SHANGHAI) CO., LTD., Shanghai (CN)

(72) Inventors: Lin Xiao, Shanghai (CN); Yijie Zhou, Shanghai (CN)

(73) Assignee: NALINV NANOTECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/998,897

(22) PCT Filed: Mar. 3, 2022

(86) PCT No.: PCT/CN2022/079114
§ 371 (c)(1),
(2) Date: Nov. 15, 2022

(87) PCT Pub. No.: WO2023/035561
PCT Pub. Date: Mar. 16, 2023

(65) Prior Publication Data
US 2024/0240085 A1 Jul. 18, 2024

(30) Foreign Application Priority Data
Sep. 8, 2021 (CN) .......................... 202111052092.4

(51) Int. Cl.
*G02B 5/20* (2006.01)
*C09K 19/20* (2006.01)
(Continued)

(52) U.S. Cl.
CPC ............ *C09K 19/2007* (2013.01); *G02B 1/14* (2015.01); *G02B 5/283* (2013.01); *G02B 5/3016* (2013.01); *C09K 2019/2078* (2013.01)

(58) Field of Classification Search
CPC . G02B 1/00; G02B 1/005; G02B 1/02; G02B 1/06; G02B 1/10; G02B 1/11;
(Continued)

(56) References Cited

U.S. PATENT DOCUMENTS 7,749,577 B2 * 7/2010 Goldfinger ........ B32B 17/10788
252/582
8,357,448 B2 * 1/2013 O'Keefe ................... B32B 7/06
359/360
(Continued)

FOREIGN PATENT DOCUMENTS

CN        104049290 A    9/2014
CN        105929471 A    9/2016
(Continued)

OTHER PUBLICATIONS

"International Application No. PCT/CN2022/079114, International Search Report and Written Opinion mailed May 30, 2022", (May 30, 2022), 8 pgs.

*Primary Examiner* — Thong Q Nguyen
(74) *Attorney, Agent, or Firm* — Schwegman Lundberg & Woessner, P.A.

(57) ABSTRACT

The disclosure relates to a birdstrike avoidance optical flexible film, a preparation method and application thereof. The birdstrike avoidance optical flexible film includes from top to bottom: a protective layer, a reflective layer, a substrate layer, an adhesive layer, and a release layer. The film has excellent selective transmission and reflection properties for visible light and ultraviolet light, and can realize effects of being transparent to human and being visible to birds. When the film is applied to buildings and/or vehicles.

(Continued)

The optical film can be applied to buildings and/or vehicles to achieve effects of no influence on human aesthetic, birdstrike avoidance, and popularization in a large area, with profound significance for harmony between humans and birds.

3 Claims, 6 Drawing Sheets

(51) Int. Cl.
*G02B 1/14* (2015.01)
*G02B 5/28* (2006.01)
*G02B 5/30* (2006.01)

(58) Field of Classification Search
CPC ......... G02B 1/111; G02B 1/113; G02B 1/115; G02B 1/116; G02B 1/14; G02B 1/18; G02B 5/00; G02B 5/003; G02B 5/0268; G02B 5/0273; G02B 5/0284; G02B 5/0294; G02B 5/0816; G02B 5/0825; G02B 5/0833; G02B 5/0841; G02B 5/0858; G02B 5/0866; G02B 5/0875; G02B 5/0891; G02B 5/26; G02B 5/28; G02B 5/283; G02B 5/30; G02B 5/3016
USPC .................................. 359/350–361, 577–598
See application file for complete search history.

(56) References Cited

U.S. PATENT DOCUMENTS

| | | | |
|---|---|---|---|
| 8,637,169 B2* | 1/2014 | Van Nutt | B32B 15/20 |
| | | | 428/688 |
| 9,200,201 B2* | 12/2015 | Tamura | B32B 17/10761 |
| 2015/0160385 A1 | 6/2015 | Hicks | |
| 2016/0041319 A1 | 2/2016 | Hicks | |
| 2018/0252957 A1* | 9/2018 | Yamamoto | C09K 19/54 |
| 2019/0084874 A1 | 3/2019 | Weng et al. | |

FOREIGN PATENT DOCUMENTS

| | | | |
|---|---|---|---|
| CN | 207483659 U | | 6/2018 |
| CN | 108508668 A | | 9/2018 |
| CN | 108680980 A | | 10/2018 |
| CN | 108873534 A | | 11/2018 |
| CN | 209784577 U | | 12/2019 |
| CN | 111093983 A | | 5/2020 |
| CN | 109143711 B | | 2/2022 |
| EP | 2734705 | * | 3/2019 |
| KR | 20210044338 A | | 4/2021 |

* cited by examiner

BIRDSTRIKE AVOIDANCE OPTICAL FLEXIBLE FILM, PREPARATION METHOD AND APPLICATION THEREOF

PRIORITY CLAIM TO RELATED APPLICATIONS

This application is a U.S. national stage filing under 35 U.S.C. § 371 from International Application No. PCT/CN2022/079114, filed on 3 Mar. 2022, which claims the benefit under 35 U.S.C. 119 to Chinese Application No. 202111052092.4, filed on 8 Sep. 2021, the benefit of priority of each of which is claimed herein, and which applications and publication are hereby incorporated herein by reference in their entirety.

TECHNICAL FIELD

The disclosure relates to the field of materials, in particular to a birdstrike avoidance optical flexible film and a preparation method and application thereof.

BACKGROUND ART

According to statistics from the U.S. Fish and Wildlife Service, nearly one billion birds die every year because of accidental striking on a glass curtain wall in the United States and Europe. The European Animal Protection Association call upon the government to make it mandatory for the glass curtain wall to have a function of preventing birds from striking. At present, in Germany, a spider web structure is mainly used to prevent birds from striking the glass, and a conventional method is to stick raptor decal or place birds' natural enemy molds on the glass to prevent birds from striking the glass. However, it is difficult for these measures to address people's aesthetic problem and popularization in a large area.

SUMMARY

A purpose of the present disclosure is to provide a birdstrike avoidance optical flexible film, a preparation method and application thereof.

In a first aspect of the present disclosure, there is provided a birdstrike avoidance optical flexible film, which includes sequentially a protective layer, a reflective layer, a substrate layer, an adhesive layer and a release layer.

In another preferred embodiment, a coating for preparing the reflective layer includes following components:
- 10 to 30 parts by weight of a polymerizable liquid crystal material,
- 0.5 to 10 parts by weight of a chiral agent,
- 0.2 to 2 parts by weight of a photoinitiator, and
- 50 to 100 parts by weight of a solvent.

In another preferred embodiment, the polymerizable liquid crystal material is selected from a group consisting of a compound of formula I, a compound of formula II, or a combination thereof;

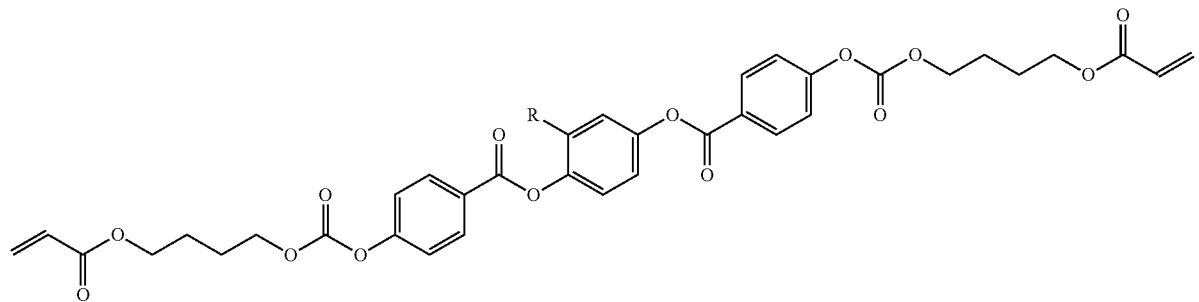

I

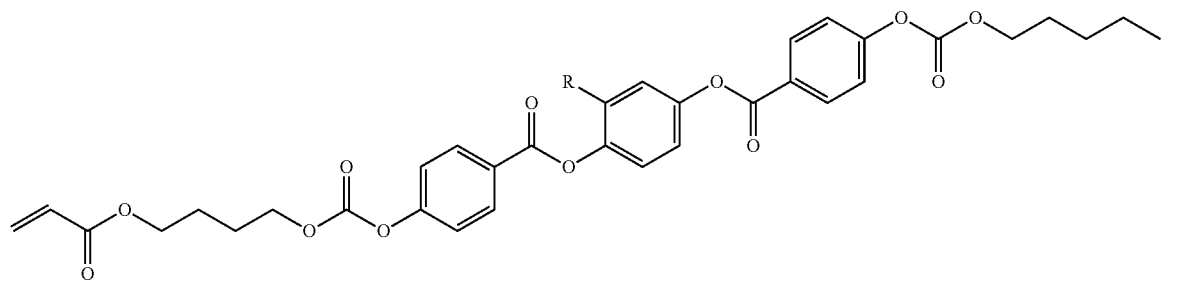

II where R is independently selected from a group consisting of $(CH_2=CH)-COO-(CH_2)_m-$, halogen, C1-C10 alkyl, and halogenated C1-C10 alkyl;

m is selected from a group consisting of 0, 1, 2, 3, 4 and 5.

In another preferred embodiment, a thickness of the reflective layer is 1 to 10 μm.

In another preferred embodiment, a total thickness of the protective layer, the reflective layer and the substrate layer is 20 to 120 μm.

In another preferred embodiment, a ratio of transmittance of the optical film for visible light to transmittance of the optical film for ultraviolet light is 1.0 to 4.0.

Or, a ratio of reflectivity of the optical film for the ultraviolet light to reflectivity of the optical film for the visible light is 1.0 to 10.0.

In a second aspect of the present disclosure, there is provided a preparation method of the film according to the first aspect of the present disclosure, which includes following steps 1 to 5.

1) A transparent coating for preparing the reflective layer is provided. The coating includes following components: the polymerizable liquid crystal material, the chiral agent, the photoinitiator and the solvent, and the components of the coating are mixed, dispersed at a high speed for coating and preparing the reflective layer.

2) The transparent coating obtained in step 1) is coated on the substrate layer, which is dried and then cured to obtain the substrate layer coated with the reflective layer.

3) The protective layer is coated on the reflective layer of the substrate layer coated with the reflective layer obtained in step 2) to obtain a protective layer-reflective layer coated substrate layer.

4) An adhesive layer is coated on the substrate layer of the protective layer-reflective layer coated substrate layer obtained in step 3).

5) A release layer is adhered to the adhesive layer of a product obtained in step 4) so as to obtain the optical film.

In another preferred embodiment, a temperature for the drying is 50 to 300° C.

Or, duration for the drying is 15 to 200 seconds.

In a third aspect of the disclosure, there is provided a usage of the film described in the first aspect of the disclosure as a birdstrike avoidance protective film for one selected from a group consisting of a building, an airport and a vehicle.

In another preferred embodiment, the optical film is adhered to an article so as to realize protection of the article and/or birds.

It should be understood that, technical features of the present disclosure described above and technical features specifically described in the following (such as in the embodiment) can be combined with each other to form a new or preferred technical solution, within the scope of the present disclosure. Due to the limitation of space, further description is omitted here for brevity.

DETAILED DESCRIPTION

Figure 1:
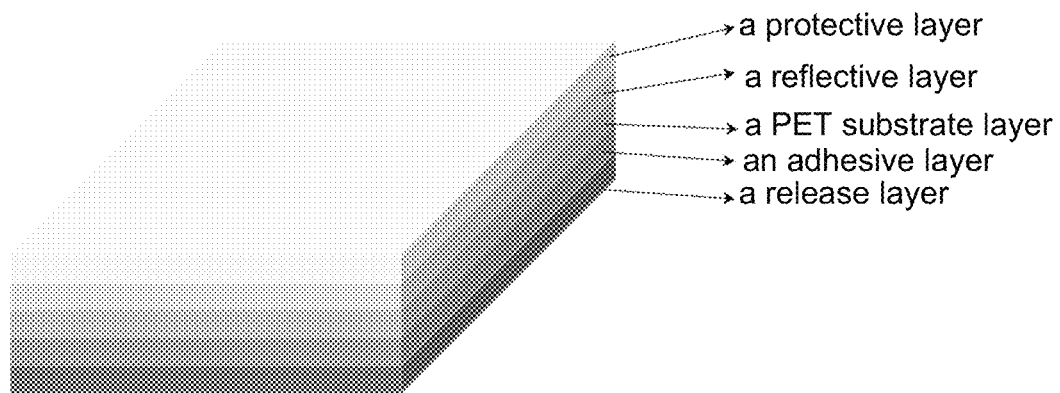
FIG. 1 is a schematic structural diagram of an optical film according to the present disclosure.

After long-term and in-depth researches, the applicant found an optical film with excellent visible light transmission and ultraviolet light reflection (i.e., a birdstrike avoidance optical flexible film) and its preparation method by optimizing composition, a structure and a preparation process of the film. The optical film with excellent optical selectivity can be applied to buildings and vehicles to achieve effects of being visually transparent to human and being visible to the birds, thus achieving effects of no influence on human aesthetic, birdstrike avoidance and popularization in a large area, with profound significance for harmony between humans and birds. On this basis, the applicant completed the present disclosure.

Optical Film

It has been found that some animals can see ultraviolet light, or colors that humans can't, which makes their vision completely different from that of humans. Birds, for example, can see ultraviolet light, so a peacock's mate is not as green and blue as proud as a peacock's rainbow seen by humans, but instead brighter feather colors may be presented in peacock's vision.

At present, there are few reports about using a transparent optical film to prevent birds from striking on the building. This disclosure starts with visual difference between humans and the birds, and prepares an optical film that is invisible to humans but visible to the birds. It can prevent the birds from striking on a glass building, does not affect aesthetic of the building at the same time, and is a convenient method to use.

In order to prevent the birds from striking on the building and build a living environment where humans and the birds coexist harmoniously, there is provided a method for birdstrike avoidance in the disclosure, which is applied to various buildings and vehicles, and specifically relates to a visible-light-transparent and ultraviolet-light-reflective film which is insensitive to humans but sensitive to the birds. The visible-light-transparent and ultraviolet-light-reflective film has advantages of simple preparation process, high production efficiency, low cost and easy use.

A preparation method and application of a birdstrike avoidance optical flexible film is provided in this disclosure, which relates to the field of an optical film, in particular to a preparation method of a visible-light-transparent and ultraviolet-light-reflective optical film. The optical film at least includes following layers: a substrate layer, a visible-light-transparent and ultraviolet-light-reflective layer, a protective layer, an adhesive layer and a release layer. The visible-light-transparent and ultraviolet-light-reflective layer mainly refers to one or more layers of liquid crystal coating, in particular to a polymerizable cholesteric liquid crystal coating, which can realize effects of being visually transparent to humans and being visible to the birds, so as to prevent the birds from striking on various buildings, vehicles and other objects without affecting human vision. The birdstrike avoidance optical flexible film according to the disclosure has a simple preparation process, high production efficiency, and does not hinder visual effect in human observation of objects, which can be widely applied to buildings, airports, and vehicles (such as automobiles, airplanes, high-speed trains, etc.) that prevent the birds from striking.

Specifically, a visible-light-transparent and ultraviolet-light-reflective optical film is provided in the disclosure, which sequentially includes a protective layer, a reflective layer, a substrate layer, an adhesive layer and a release layer.

In another preferred embodiment, a coating for preparing the reflective layer includes following components:
- 10 to 30 parts by weight (preferably 15 to 25 parts by weight, more preferably 20 parts by weight) of a polymerizable liquid crystal material,
- 0.5 to 10 parts by weight (preferably 1 to 9 parts by weight, more preferably 1.2 to 7.8 parts by weight) of a chiral agent,
- 0.2 to 2 parts by weight (preferably 0.5 to 1.5 parts by weight, more preferably 0.8 to 1 part by weight) of a photoinitiator, and
- 50 to 100 parts by weight (preferably 60 to 85 parts by weight, more preferably 70 to 80 parts by weight) of a solvent.

In another preferred embodiment, the reflective layer is a polymerizable cholesteric liquid crystal coating.

In another preferred embodiment, the polymerizable liquid crystal material is mainly composed of a rigid benzene ring and a flexible acrylic segment, and can be bifunctional, monofunctional or multifunctional.

In another preferred embodiment, the polymerizable liquid crystal material is selected from a group consisting of a compound of formula I, a compound of formula II, or a combination thereof;

m is selected from a group consisting of 0, 1, 2, 3, 4 and 5.

In another preferred embodiment, R is selected from a group consisting of halogen and C1-C6 alkyl.

In another preferred embodiment, R is selected from a group consisting of fluorine and methyl.

It should be understood that in the present disclosure, for the polymerizable liquid crystal material, an expression "bifunctional" refers to a case where both ends of a main chain of the polymerizable liquid crystal material are with acrylate groups; an expression "monofunctional" refers to a case where only one end of the main chain of the polymerizable liquid crystal material is with the acrylate group; or an expression "multifunctional" refers to both ends of the main chain of the polymerizable liquid crystal material are with acrylic double bond functional groups.

In another preferred embodiment, the polymerizable liquid crystal material is a specific polymerizable liquid crystal material used in Embodiments 1 to 11.

In the present disclosure, a torque value (HTP, in $\mu m^{-1}$) of the chiral agent is more than 10, preferably more than 30, more preferably more than 50, preferably is between 50 and 100.

In the present disclosure, the chiral agent is left-handed or right-handed, preferably selected from a group consisting of

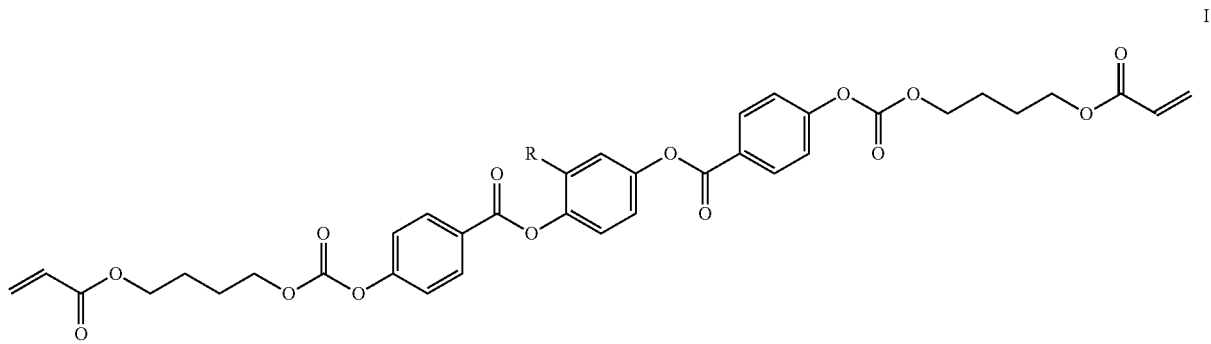

I

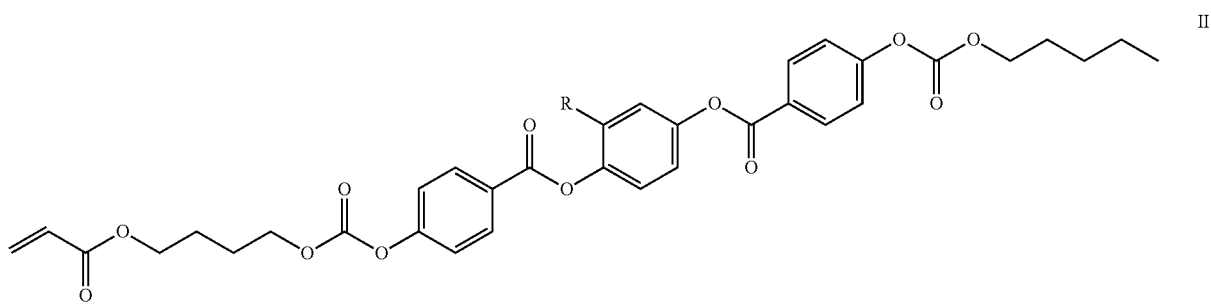

II where R is independently selected from a group consisting of $(CH_2=CH)-COO-(CH_2)_m-$, halogen, C1-C10 alkyl, and halogenated C1-C10 alkyl;

a chiral agent 1, a chiral agent 2, a chiral agent 3, a chiral agent 4, a chiral agent 5, or combination thereof, or other materials with a chiral structures.

TABLE 1
| Chiral Agent |
| --- |
| Formula |
Chiral agent 1
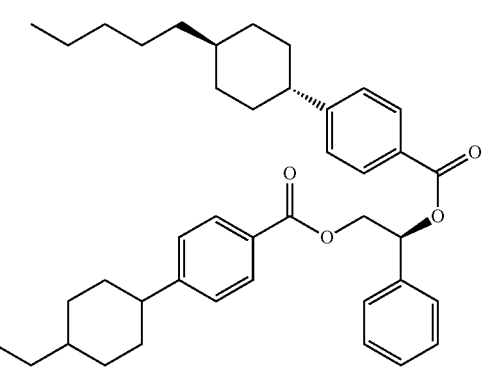
Chiral agent 2
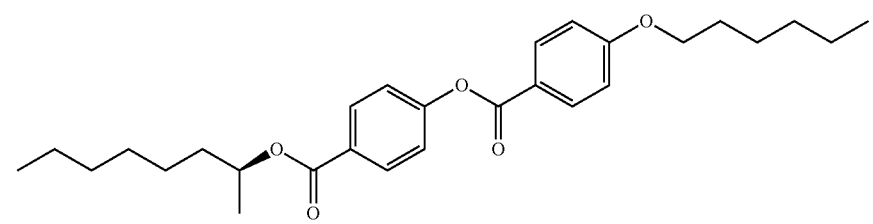 [SMILES: CCCCCCOc1ccc(C(=O)Oc2ccc(C(=O)O[C@@H](C)CCCCCC)cc2)cc1]
Chiral agent 3
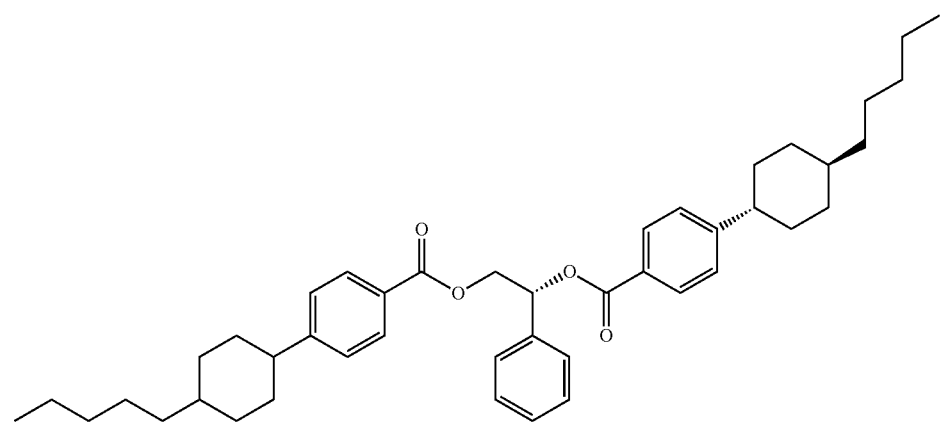 [SMILES: CCCCCC1CCC(c2ccc(C(=O)OC[C@H](OC(=O)c3ccc([C@H]4CC[C@H](CCCCC)CC4)cc3)c3ccccc3)cc2)CC1]
Chiral agent 4
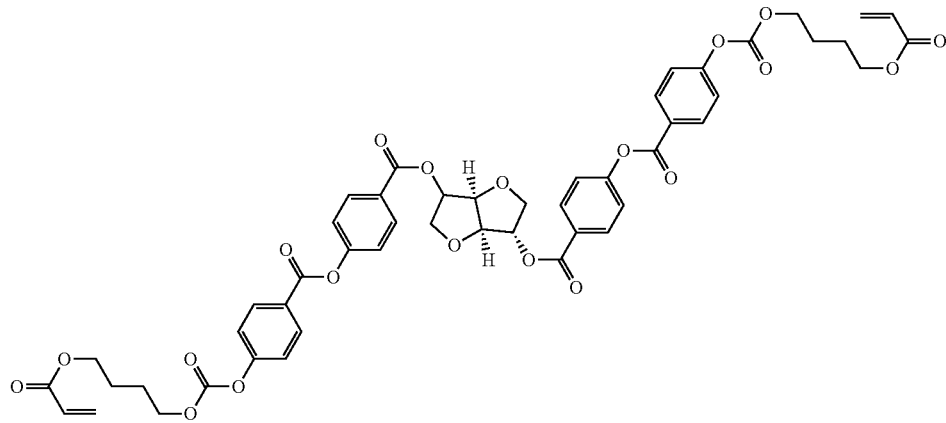 [SMILES: C=CC(=O)OCCCCOC(=O)Oc1ccc(C(=O)Oc2ccc(C(=O)OC3CO[C@@H]4[C@@H](OC(=O)c5ccc(OC(=O)c6ccc(OC(=O)OCCCCOC(=O)C=C)cc6)cc5)CO[C@H]34)cc2)cc1]

TABLE 1-continued

Chiral Agent

Formula

Chiral agent 5

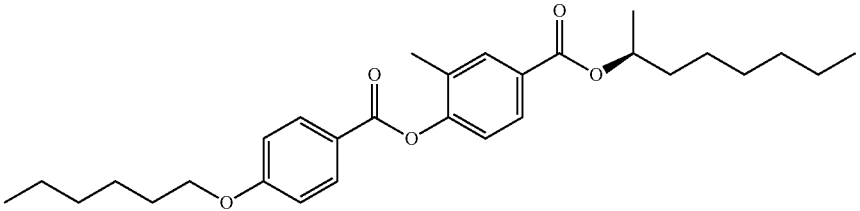 [SMILES: CCCCCCOc1ccc(C(=O)Oc2ccc(C(=O)O[C@@H](C)CCCCCC)cc2C)cc1]

In another preferred embodiment, the photoinitiator is a common kind of photoinitiator, preferably selected from a group consisting of 1173, 184, 907, 369, 651, 819, TPO, or a combination thereof.

TABLE 2

Photoinitiator

| | Formula |
|---|---|
| 1173 | |
| 184 | |
| 907 | |
| 369 | |
| 651 | |
| 819 | |
| TPO | |

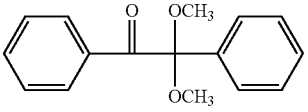

In another preferred embodiment, the solvent is a common organic solvent, preferably selected from a group consisting of ester solvents (such as ethyl acetate and butyl acetate), benzene solvents (such as toluene and xylene), ketone solvents (acetone, butanone, cyclopentanone and cyclohexanone), or combinations thereof.

In another preferred embodiment, a thickness of the reflective layer is 1 to 10 μm, preferably 2 to 8 μm, more preferably 3 to 7 μm.

In another preferred embodiment, the reflective layer has a structure of one or more layers (such as 2, 3 and 4 layers).

In another preferred embodiment, the reflective layer mainly refers to a reflective layer which is transparent to visible light and reflective for ultraviolet light (preferably within a UVA(320 to 420 nm) band sensitive to birds, more preferably within a band ranging from 350 to 380 nm) under human vision.

In another preferred embodiment, the substrate layer is a flexible and transparent plastic film, preferably a flexible and transparent film selected from a group consisting of PE, PET, PP, PMMA, EVA, PVC, PU, TPU, PI, preferably a commonly used plastic film made of PET, PE, TPU, etc., more preferably a film made of high-definition and hightransparency PET substrate, with an optical haze value of lower than 2.0%, preferably lower than 1.0%, and transmittance of higher than 88%, preferably higher than 90%.

In another preferred embodiment, a thickness of the substrate layer is 10 to 200 µm, preferably 20 to 150 µm, more preferably 30 to 100 µm.

In another preferred embodiment, the protective layer is a material selected from a group consisting of UV resin, thermosetting resin, or a combination thereof.

In another preferred embodiment, the protective layer is a hardened layer, preferably selected from a group consisting of a UV hardened layer (or UV cured layer), a thermal cured layer (a silicone coating, a two-component polyurethane coating), preferably a UV hardened layer.

In another preferred embodiment, a thickness of the protective layer is 0.1 to 10 µm, preferably 0.5 to 5 µm, more preferably 0.8 to 3.0 µm.

In another preferred embodiment, hardness of the protective layer is 4 to 6 H.

In another preferred embodiment, the adhesive layer is with conventional acrylic pressure sensitive adhesive or polyurethane adhesive.

In another preferred embodiment, the release layer is a conventional PET or PE release film.

In another preferred embodiment, a total thickness of the protective layer, the reflective layer and the substrate layer is 20 to 120 µm, preferably 30 to 100 µm, more preferably 40 to 80 µm.

In another preferred embodiment, visible light transmittance of the optical film is higher than 80%, preferably higher than 85%.

In another preferred embodiment, ultraviolet light reflectivity of the optical film is higher than 10%, preferably higher than 30%, and more preferably higher than 60%.

In another preferred embodiment, a transmittance/reflectance ratio of the optical film to visible light (with a wavelength of 400 to 760 nm) is 3 to 10, preferably 5 to 8.5, more preferably 6.5 to 8.

In another preferred embodiment, the transmittance/reflectance ratio of the optical film to ultraviolet light (with a wavelength of 320 to 420 nm) is 0.1 to 100, preferably 0.2 to 10, more preferably 0.3 to 3.

In another preferred embodiment, a ratio of transmittance of the optical film to the visible light (with the wavelength of 400 to 760 nm) to transmittance of the optical film to the ultraviolet light (with the wavelength of 320 to 420 nm) is 1 to 4, preferably 1.2 to 3.8, more preferably 1.4 to 3.7.

In another preferred embodiment, a ratio of reflectivity of the optical film to the ultraviolet light (with the wavelength of 320 to 420 nm) to reflectivity of the optical film to the visible light (with a wavelength of 400 to 760 nm) is 1 to 10, preferably 2 to 8, more preferably 3 to 7.

In another preferred embodiment, the optical film has excellent optical selectivity, and can transmit the visible light and reflect the ultraviolet light with high selectivity, thus realizing colorless and transparent appearance under human vision.

In another preferred embodiment, a haze value of the optical film is less than or equal to 1.5%, preferably less than or equal to 1.3%, more preferably less than or equal to 1.1%.

Preparation Method

The optical film according to the present disclosure can be prepared by conventional methods in the art, and all of used raw materials can be available commercially.

Typically, the optical film according to the present disclosure is prepared as follows.

1) A transparent coating for preparing the reflective layer is provided. The coating includes following components: the polymerizable liquid crystal material, the chiral agent, the photoinitiator and the solvent, and the components of the coating are mixed, dispersed at a high speed for coating and preparing the reflective layer.

2) The transparent coating obtained in step 1) is coated on the substrate layer, which is dried and then cured to obtain the substrate layer coated with the reflective layer.

3) The protective layer is coated on the reflective layer of the substrate layer coated with the reflective layer obtained in step 2) to obtain a protective layer-reflective layer coated substrate layer.

4) An adhesive layer is coated on the substrate layer of the protective layer-reflective layer coated substrate layer obtained in step 3).

5) A release layer is adhered to the adhesive layer of a product obtained in step 4) so as to obtain the optical film.

In another preferred embodiment, in step 1), a dispersion speed for the dispersing at the high speed is 1000 to 2000 rpm, preferably 1200 to 1600 rpm.

In another preferred embodiment, in step 1), dispersion time of the dispersing at the high speed is 5 to 60 min, preferably 15 to 40 min.

In another preferred embodiment, the step 2) further comprises a following step in which the transparent coating obtained in the step 1) is filtered.

In another preferred embodiment, a filter paper used in filtering is of polytetrafluoroethylene.

In another preferred embodiment, a temperature for the drying is 50 to 300° C., preferably 80 to 200° C., more preferably 90 to 110° C.

In another preferred embodiment, duration for the drying is 15 to 200 seconds, preferably 20 to 80 seconds, more preferably 25 to 60 seconds, and most preferably 25 to 40 seconds.

In another preferred embodiment, the curing is performed by using xenon lamp irradiation, and power of the xenon lamp is 0.8 to 4 KW, preferably 1 to 2 KW, more preferably 1.2 to 1.8 kW.

Irradiation time in the curing is 5 to 30 seconds, preferably 10 to 20 seconds. In another preferred embodiment, in step 3), the protective layer is coated and then cured.

Application

There is provided a usage of the optical film as a birdstrike avoidance protective film for one selected from a group consisting of a building, an airport and a vehicle.

Specifically, the optical film is adhered to an article selected from a group consisting of the following to realize protection of the article and/or birds: buildings, airports and vehicles.

In another preferred embodiment, the vehicle is selected from a group consisting of automobiles, airplanes and high-speed rails.

Compared with the prior art, the disclosure has following main advantages.

(1) the optical film has excellent optical selectivity, which can efficiently transmit the visible light and efficiently reflect or block the ultraviolet light, thus realizing the effects of being visually transparent to humans and being visible to the birds.

(2) The optical film can be applied to the buildings and/or the vehicles to achieve effects of no influence on human aesthetic, birdstrike avoidance and popularization in a large area, with profound significance for harmony between humans and birds.

(3) The preparation method of the optical film has advantages of simple preparation process, high production efficiency, low cost and easy use.

The disclosure will be further explained with reference to following specific embodiments. It should be understood that these embodiments are only used to illustrate the disclosure but not intended to limit scope of the disclosure. In the following embodiments, experimental methods without specific conditions are usually carried out according to conventional conditions or conditions suggested by a manufacturer. Unless otherwise stated, percentages and parts are calculated by weight.

Unless otherwise defined, all professional and scientific terms used herein have same meanings as those familiar to those skilled in the art. In addition, any methods and materials similar or equal to those described can be used in the method according to the present disclosure. Preferred implementations and materials described in this document are for illustration only.

General Test Method

Transmittance and Reflectivity

The transmittance and reflectivity were measured on a UV-VIS-NIR spectrophotometer (with a model of U-4100, 250 to 2500 nm) produced by Hitachi, Japan.

Haze

The haze value of the film was characterized by using a portable haze meter from Yingjianda Co. Ltd.

Embodiment 1 (with One Layer)

Step (1), a visible-light-transparent and ultraviolet-light-reflective transparent coating is prepared.

20 parts of a polymerizable liquid crystal material (which is bifunctional, with R being F element), 15.6 parts of a chiral agent, 0.8 parts of a photoinitiator (1173) and 78 parts of toluene are disposed into a stainless steel container and are pre-dispersed in a high-speed shear disperser at 1500 r/min for 30 minutes so as to obtain a transparent solution, which is then filtered by using a polytetrafluoroethylene filter paper to obtain a transparent coating solution.

Step (2), a visible-light-transparent and ultraviolet-light-reflective flexible optical film is prepared.

The prepared solution was coated on a surface of a 50 μm PET film using a 20 μm precision wire bar, and then baked in an oven at 100° C. for 30 seconds to fully volatilize the solvent. Then, the coated PET film was cured under a xenon lamp with a power of 1.5 KW, so as to obtain a visible-light-transparent and ultraviolet-light-reflective coating. Finally, a UV curing layer (with a brand of UV935/hardness of 4 H) was coated on a surface of the coating, and then a protective layer with a surface hardness of 4 H was obtained after curing. After that, the other side of the PET film is coated with installation glue for adhering a layer of PET release protective film, so that the visible-light-transparent and ultraviolet-light-reflective PET optical film can be obtained.

Figure 2:
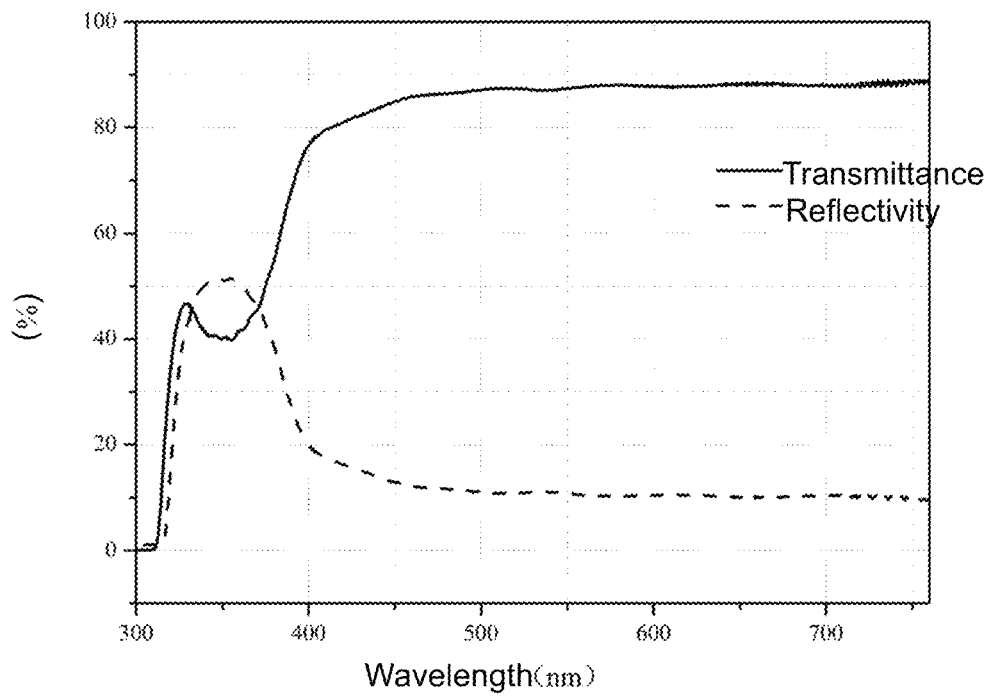
FIGS. 2 to 12 are reflectance/transmittance spectra of optical films obtained in Embodiments 1 to 11 according to the present disclosure.

Step (3): an optical test is carried out, and an optical spectrum of the visible-light-transparent ultraviolet-light-reflective film prepared above is shown in FIG. 2.

Embodiment 2 (with One Layer and Different Reflection Wavelengths)

Step (1), a visible-light-transparent and ultraviolet-light-reflective transparent coating is prepared.

20 parts of a polymerizable liquid crystal material (which is monofunctional, with R being CH3), 15.6 parts of a chiral agent, 0.8 parts of a photoinitiator (1173) and 78 parts of butyl acetate are disposed into a stainless steel container and are pre-dispersed in a high-speed shear disperser at 1500 r/min for 30 minutes so as to obtain a transparent solution, which is then filtered by using a polytetrafluoroethylene filter paper to obtain a transparent coating solution.

Step (2), a visible-light-transparent and ultraviolet-light-reflective flexible optical film is prepared.

The prepared solution was coated on a surface of a 50 μm PET film using a 20 μm precision wire bar, and then baked in an oven at 100° C. for 30 seconds to fully volatilize the solvent. Then, the coated PET film was cured under a xenon lamp with a power of 1.5 KW, so as to obtain a visible-light-transparent and ultraviolet-light-reflective coating. Finally, a UV curing layer (with a brand of UV935/hardness of 4 H) was coated on a surface of the coating, and then a protective layer with a surface hardness of 4 H was obtained after curing. After that, the other side of the PET film is coated with installation glue for adhering a layer of PET release protective film, so that a resulting visible-light-transparent and ultraviolet-light-reflective PET optical film can be obtained.

Figure 3:
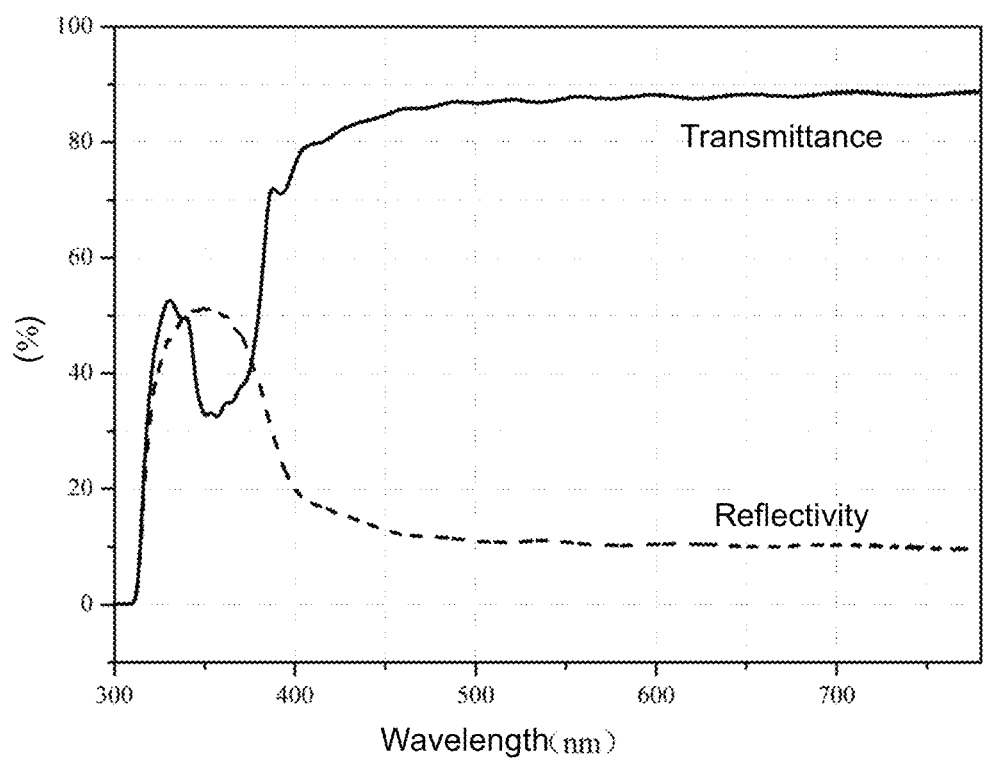

Step (3): an optical test is carried out, and an optical spectrum of the visible-light-transparent ultraviolet-light-reflective film prepared above is shown in FIG. 3.

Embodiment 3 (with One Layer and Different Chiral Agents)

Step (1), a visible-light-transparent and ultraviolet-light-reflective transparent coating is prepared.

20 parts of a polymerizable liquid crystal material (which is monofunctional, with R being CH3), 24.3 parts of a chiral agent, 0.8 parts of a photoinitiator (1173) and 78 parts of cyclohexanone are disposed into a stainless steel container and are pre-dispersed in a high-speed shear disperser at 1500 r/min for 30 minutes so as to obtain a transparent solution, which is then filtered by using a polytetrafluoroethylene filter paper to obtain a transparent coating solution.

Step (2), a visible-light-transparent and ultraviolet-light-reflective flexible optical film is prepared.

The prepared solution was coated on a surface of a 50 μm PET film using a 20 μm precision wire bar, and then baked in an oven at 100° C. for 30 seconds to fully volatilize the solvent. Then, the coated PET film was cured under a xenon lamp with a power of 1.5 KW, so as to obtain a visible-light-transparent and ultraviolet-light-reflective coating. Finally, a UV curing layer (with a brand of UV935/hardness of 4 H) was coated on a surface of the coating, and then a protective layer with a surface hardness of 4 H was obtained after curing. After that, the other side of the PET film is coated with installation glue for adhering a layer of PET release protective film, so that a resulting visible-light-transparent and ultraviolet-light-reflective PET optical film can be obtained.

Figure 4:
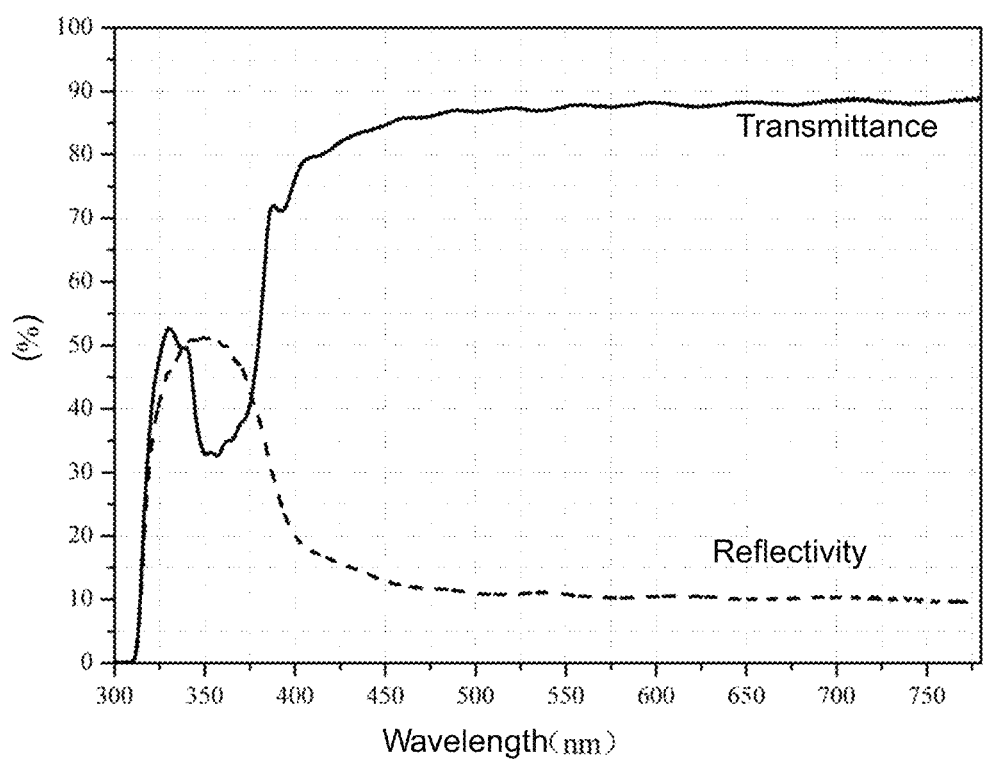

Step (3): an optical test is carried out, and an optical spectrum of the visible-light-transparent ultraviolet-light-reflective film prepared above is shown in FIG. 4.

Embodiment 4 (with One Layer and Different Chiral Agents)

Step (1), a visible-light-transparent and ultraviolet-light-reflective transparent coating is prepared.

20 parts of a polymerizable liquid crystal material (which is bifunctional, with R being CH3), 24.3 parts of a chiral agent, 0.8 parts of a photoinitiator (1173), 39 parts of toluene and 39 parts of butyl acetate are disposed into a stainless steel container and are pre-dispersed in a high-speed shear disperser at 1500 r/min for 30 minutes so as to obtain a transparent solution, which is then filtered by using a polytetrafluoroethylene filter paper to obtain a transparent coating solution.

Step (2), a visible-light-transparent and ultraviolet-light-reflective flexible optical film is prepared.

The prepared solution was coated on a surface of a 50 μm PET film using a 20 μm precision wire bar, and then baked in an oven at 100° C. for 30 seconds to fully volatilize the solvent. Then, the coated PET film was cured under a xenon lamp with a power of 1.5 KW, so as to obtain a visible-light-transparent and ultraviolet-light-reflective coating. Finally, a UV curing layer (with a brand of UV935/hardness of 4 H) was coated on a surface of the coating, and then a protective layer with a surface hardness of 4 H was obtained after curing. After that, the other side of the PET film is coated with installation glue for adhering a layer of PET release protective film, so that a resulting visible-light-transparent and ultraviolet-light-reflective PET optical film can be obtained.

Figure 5:
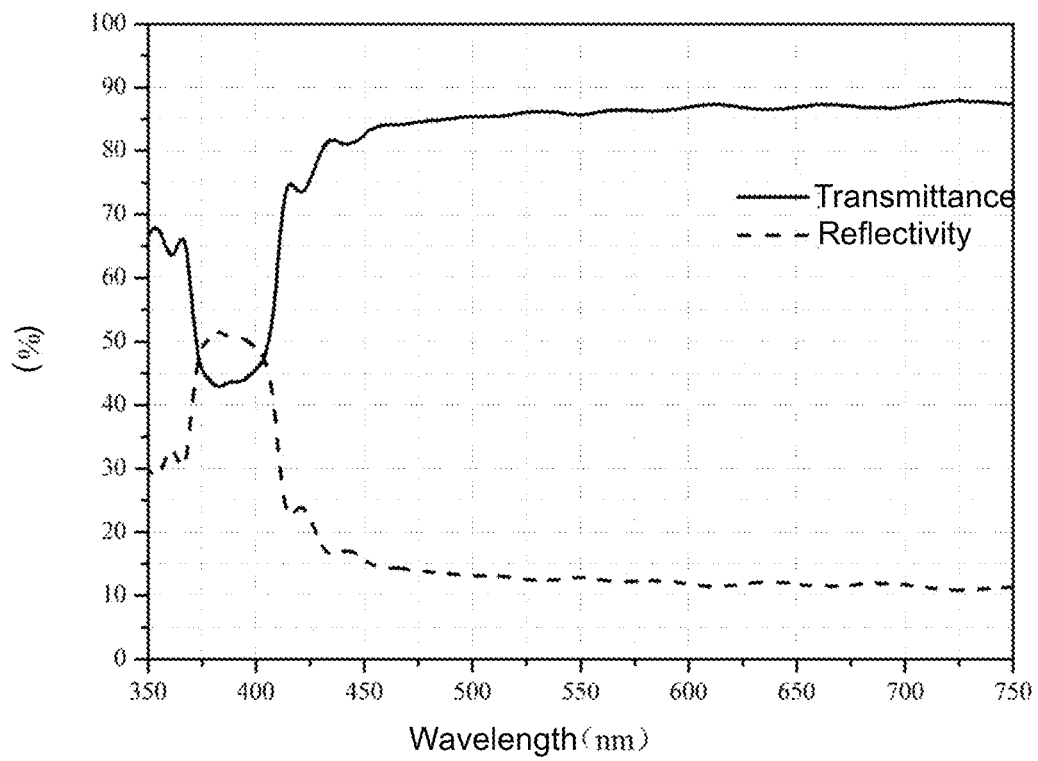

Step (3): an optical test is carried out, and an optical spectrum of the visible-light-transparent ultraviolet-light-reflective film prepared above is shown in FIG. 5.

Embodiment 5

Step (1), a visible-light-transparent and ultraviolet-light-reflective transparent coating is prepared.

20 parts of a polymerizable liquid crystal material (which is bifunctional, with R being CH3), 37.8 parts of a chiral agent, 1.0 parts of a photoinitiator (1173) and 78 parts of toluene are disposed into a stainless steel container and are pre-dispersed in a high-speed shear disperser at 1500 r/min for 30 minutes so as to obtain a transparent solution, which is then filtered by using a polytetrafluoroethylene filter paper to obtain a transparent coating solution.

Step (2), a visible-light-transparent and ultraviolet-light-reflective flexible optical film is prepared.

The prepared solution was coated on a surface of a 50 μm PET film using a 20 μm precision wire bar, and then baked in an oven at 100° for 30 seconds to fully volatilize the solvent. Then, the coated PET film was cured under a xenon lamp with a power of 1.5 KW, so as to obtain a visible-light-transparent and ultraviolet-light-reflective coating. Finally, a UV curing layer (with a brand of UV935/hardness of 4 H) was coated on a surface of the coating, and then a protective layer with a surface hardness of 4 H was obtained after curing. After that, the other side of the PET film is coated with installation glue for adhering a layer of PET release protective film, so that a resulting visible-light-transparent and ultraviolet-light-reflective PET optical film can be obtained.

Figure 6:
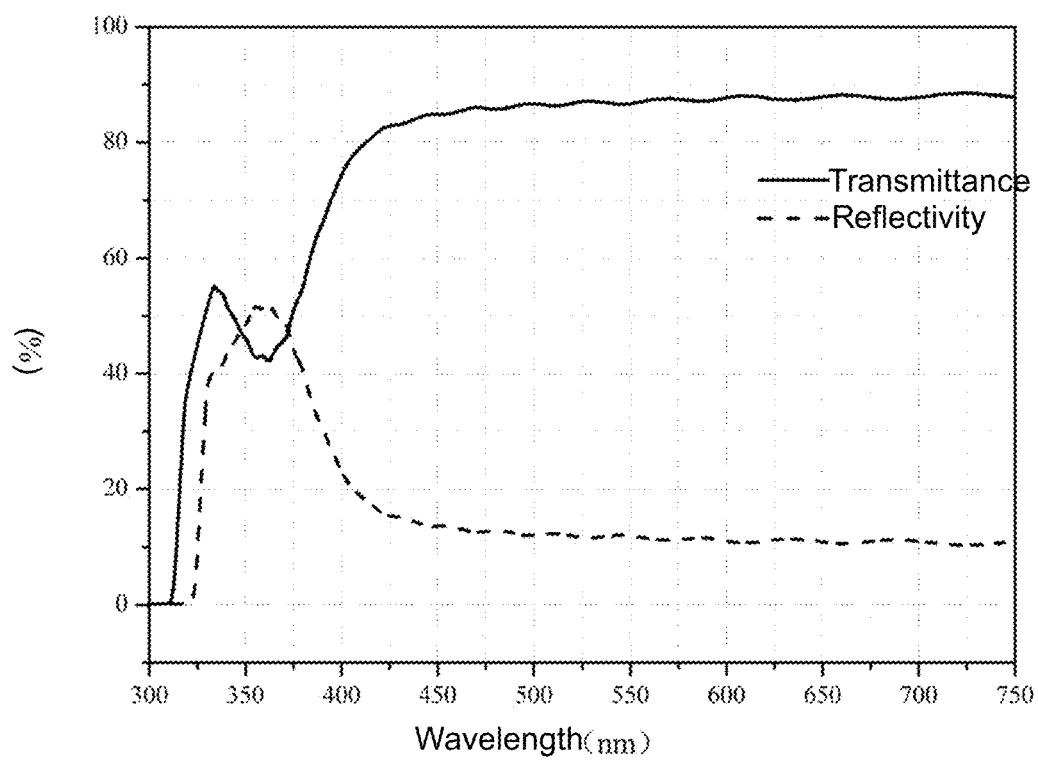

Step (3): an optical test is carried out, and an optical spectrum of the visible-light-transparent ultraviolet-light-reflective film prepared above is shown in FIG. 6.

Embodiment 6

Step (1), a visible-light-transparent and ultraviolet-light-reflective transparent coating is prepared.

20 parts of a polymerizable liquid crystal material (which is monofunctional, with R being CH3), 37.8 parts of a chiral agent, 0.8 parts of a photoinitiator (TPO) and 78 parts of cyclohexanone are disposed into a stainless steel container and are pre-dispersed in a high-speed shear disperser at 1500 r/min for 30 minutes so as to obtain a transparent solution, which is then filtered by using a polytetrafluoroethylene filter paper to obtain a transparent coating solution.

Step (2), a visible-light-transparent and ultraviolet-light-reflective flexible optical film is prepared.

The prepared solution was coated on a surface of a 50 μm PET film using a 20 μm precision wire bar, and then baked in an oven at 100° C. for 30 seconds to fully volatilize the solvent. Then, the coated PET film was cured under a xenon lamp with a power of 1.5 KW, so as to obtain a visible-light-transparent and ultraviolet-light-reflective coating. Finally, a UV curing layer (with a brand of UV935/hardness of 4 H) was coated on a surface of the coating, and then a protective layer with a surface hardness of 4 H was obtained after curing. After that, the other side of the PET film is coated with installation glue for adhering a layer of PET release protective film, so that a resulting visible-light-transparent and ultraviolet-light-reflective PET optical film can be obtained.

Figure 7:
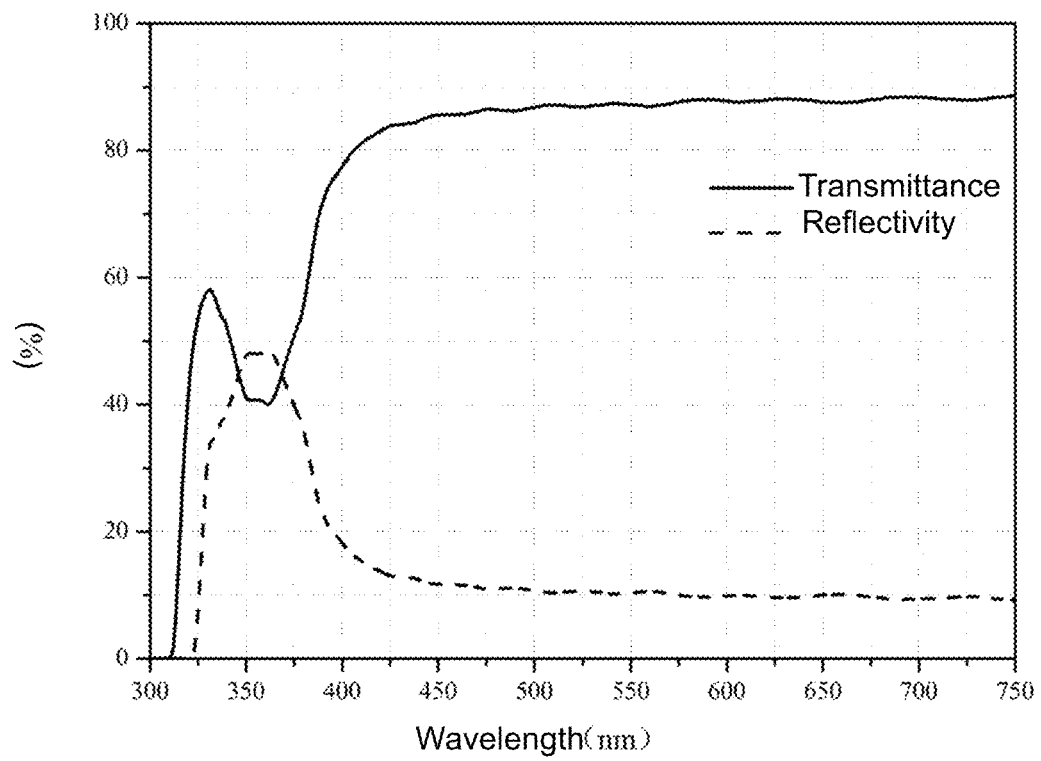

Step (3): an optical test is carried out, and an optical spectrum of the visible-light-transparent ultraviolet-light-reflective film prepared above is shown in FIG. 7.

Embodiment 7

Step (1), a visible-light-transparent and ultraviolet-light-reflective transparent coating is prepared.

20 parts of a polymerizable liquid crystal material (which is bifunctional, with R being CH3), 41.2 parts of a chiral agent, 0.8 parts of a photoinitiator (184) and 78 parts of toluene are disposed into a stainless steel container and are pre-dispersed in a high-speed shear disperser at 1500 r/min for 30 minutes so as to obtain a transparent solution, which is then filtered by using a polytetrafluoroethylene filter paper to obtain a transparent coating solution.

Step (2), a visible-light-transparent and ultraviolet-light-reflective flexible optical film is prepared.

The prepared solution was coated on a surface of a 50 μm PET film using a 20 μm precision wire bar, and then baked in an oven at 100° C. for 30 seconds to fully volatilize the solvent. Then, the coated PET film was cured under a xenon lamp with a power of 1.5 KW, so as to obtain a visible-light-transparent and ultraviolet-light-reflective coating. Finally, a UV curing layer (with a brand of UV935/hardness of 4 H) was coated on a surface of the coating, and then a protective layer with a surface hardness of 4 H was obtained after curing. After that, the other side of the PET film is coated with installation glue for adhering a layer of PET release protective film, so that a resulting visible-light-transparent and ultraviolet-light-reflective PET optical film can be obtained.

Figure 8:
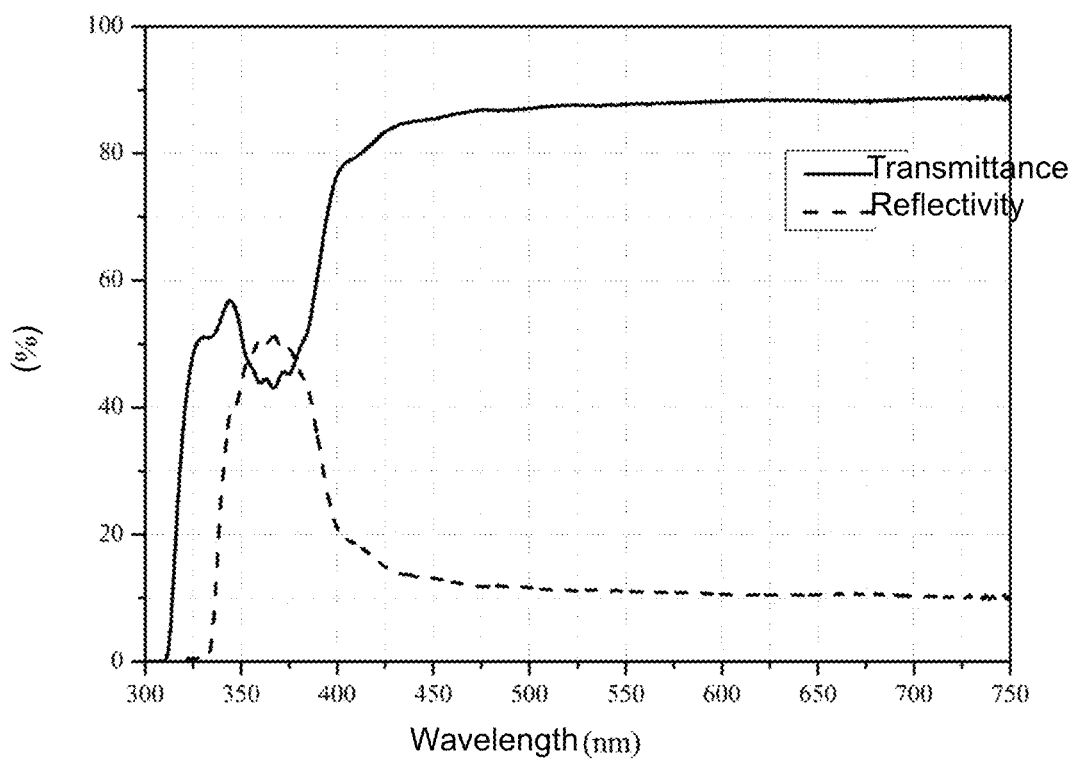

Step (3): an optical test is carried out, and an optical spectrum of the visible-light-transparent ultraviolet-light-reflective film prepared above is shown in FIG. 8.

Embodiment 8

Step (1), a visible-light-transparent and ultraviolet-light-reflective transparent coating is prepared.

20 parts of a polymerizable liquid crystal material (in which a ratio of a monofunctional component and a bifunctional component is 1:9, with R being CH3), 41.2 parts of a chiral agent, 0.8 parts of a photoinitiator (TPO) and 78 parts of toluene are disposed into a stainless steel container and are pre-dispersed in a high-speed shear disperser at 1500 r/min for 30 minutes so as to obtain a transparent solution, which is then filtered by using a polytetrafluoroethylene filter paper to obtain a transparent coating solution.

Step (2), a visible-light-transparent and ultraviolet-light-reflective flexible optical film is prepared.

The prepared solution was coated on a surface of a 50 μm PET film using a 20 μm precision wire bar, and then baked in an oven at 100° C. for 30 seconds to fully volatilize the solvent. Then, the coated PET film was cured under a xenon lamp with a power of 1.5 KW, so as to obtain a visible-light-transparent and ultraviolet-light-reflective coating. Finally, a UV curing layer (with a brand of UV935/hardness of 4 H) was coated on a surface of the coating, and then a protective layer with a surface hardness of 4 H was obtained after curing. After that, the other side of the PET film is coated with installation glue for adhering a layer of PET release protective film, so that a resulting visible-light-transparent and ultraviolet-light-reflective PET optical film can be obtained.

Figure 9:
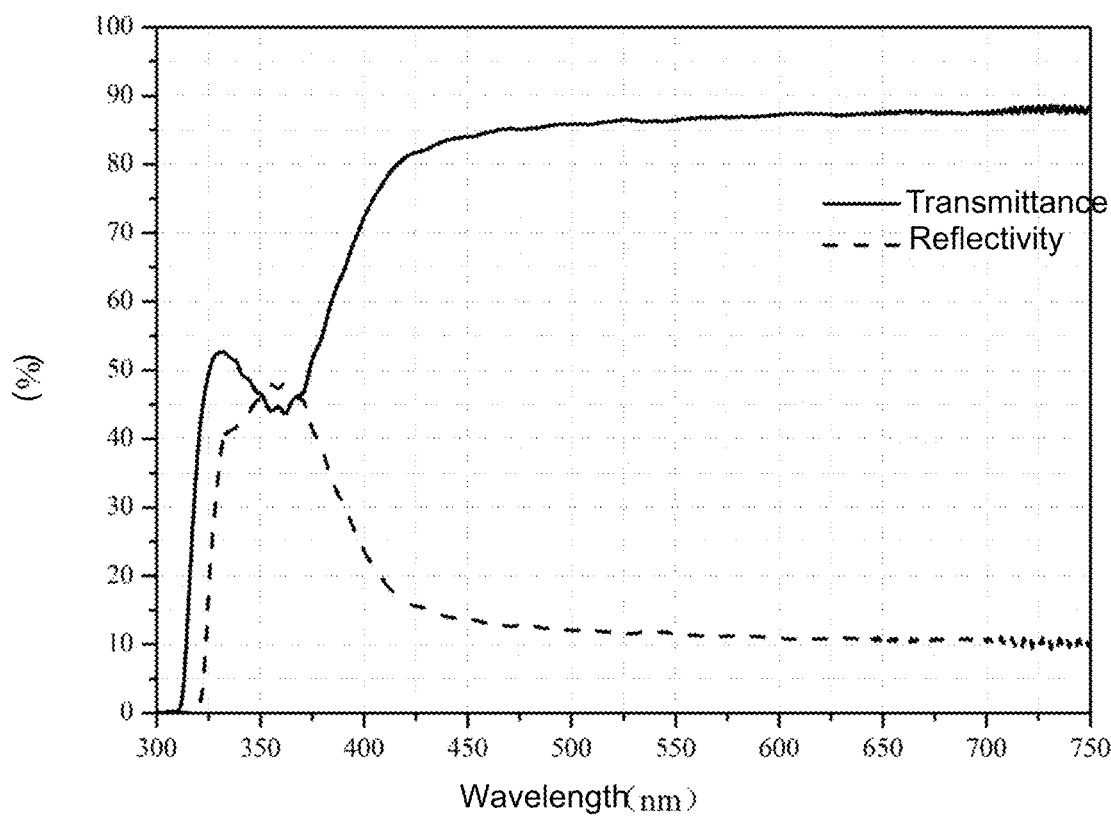

Step (3): an optical test is carried out, and an optical spectrum of the visible-light-transparent ultraviolet-light-reflective film prepared above is shown in FIG. 9.

Embodiment 9

Step (1), a visible-light-transparent and ultraviolet-light-reflective transparent coating is prepared.

20 parts of a polymerizable liquid crystal material (which is bifunctional, with R being CH3), 41.2 parts of a chiral agent, 0.8 parts of a photoinitiator (1173) and 78 parts of toluene are disposed into a stainless steel container and are pre-dispersed in a high-speed shear disperser at 1500 r/min for 30 minutes so as to obtain a transparent solution, which is then filtered by using a polytetrafluoroethylene filter paper to obtain a transparent coating solution.

Step (2), a visible-light-transparent and ultraviolet-light-reflective flexible optical film is prepared.

The prepared solution was coated on a surface of a 50 μm PET film using a 20 μm precision wire bar, and then baked in an oven at 100° C. for 30 seconds to fully volatilize the solvent. Then, the coated PET film was cured under a xenon lamp with a power of 1.5 KW, so as to obtain a visible-light-transparent and ultraviolet-light-reflective coating. Finally, a UV curing layer (with a brand of UV935/hardness of 4 H) was coated on a surface of the coating, and then a protective layer with a surface hardness of 4 H was obtained after curing. After that, the other side of the PET film is coated with installation glue for adhering a layer of PET release protective film, so that a resulting visible-light-transparent and ultraviolet-light-reflective PET optical film can be obtained.

Figure 10:
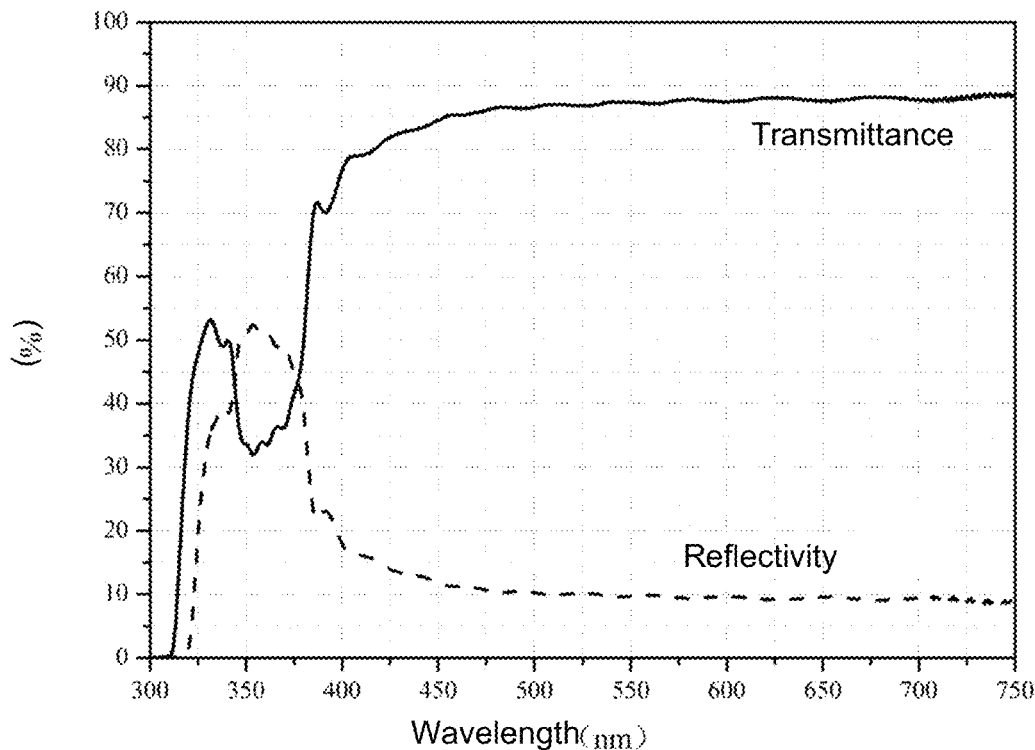

Step (3): an optical test is carried out, and an optical spectrum of the visible-light-transparent ultraviolet-light-reflective film prepared above is shown in FIG. 10.

Embodiment 10

Step (1), a visible-light-transparent and ultraviolet-light-reflective transparent coating is prepared.

20 parts of a polymerizable liquid crystal material (which is bifunctional, with R being CH3), 41.2 parts of a chiral agent, 0.8 parts of a photoinitiator (1173) and 78 parts of toluene are disposed into a stainless steel container and are pre-dispersed in a high-speed shear disperser at 1500 r/min for 30 minutes so as to obtain a transparent solution, which is then filtered by using a polytetrafluoroethylene filter paper to obtain a transparent coating solution.

Step (2), a visible-light-transparent and ultraviolet-light-reflective flexible optical film is prepared.

The prepared solution was coated on a surface of a 50 μm PET film using a 20 μm precision wire bar, and then baked in an oven at 100° C. for 30 seconds to fully volatilize the solvent. Then, the coated PET film was cured under a xenon lamp with a power of 1.5 KW, so as to obtain a visible-light-transparent and ultraviolet-light-reflective coating. Finally, the coating according to Embodiment 1 was recoated with the same method, and then a visible-light-transparent ultraviolet-light-reflective coating (with a total thickness of the reflective layer being 6.6 m) can be obtained, and then a UV curing layer (with a brand of UV935/hardness of 4 H) was coated on a surface of the coating, and then a protective layer with a surface hardness of 4 H was obtained after curing. After that, the other side of the PET film is coated with installation glue for adhering a layer of PET release protective film, so that a resulting visible-light-transparent and ultraviolet-light-reflective PET optical film can be obtained.

Figure 11:
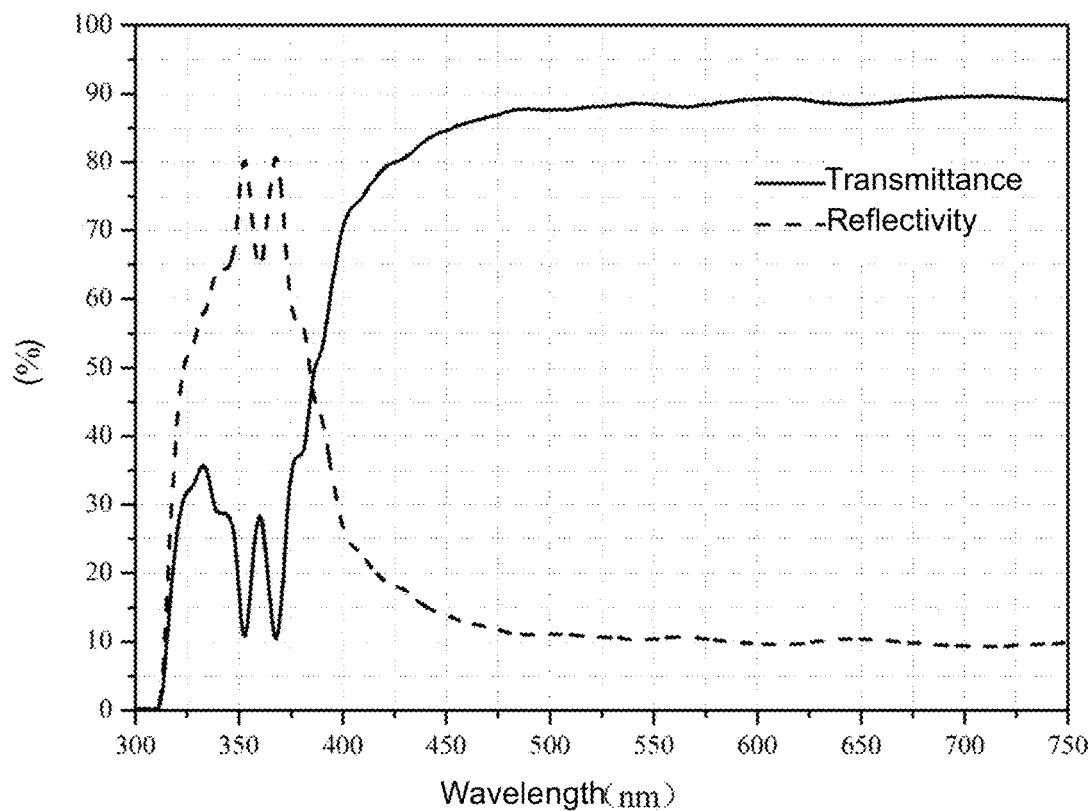

Step (3): an optical test is carried out, and an optical spectrum of the visible-light-transparent ultraviolet-light-reflective film prepared above is shown in FIG. 11.

Embodiment 11

Step (1), a visible-light-transparent and ultraviolet-light-reflective transparent coating is prepared.

20 parts of a polymerizable liquid crystal material (which is bifunctional, with R being CH3), 41.2 parts of a chiral agent, 0.8 parts of a photoinitiator (1173) and 78 parts of toluene are disposed into a stainless steel container and are pre-dispersed in a high-speed shear disperser at 1500 r/min for 30 minutes so as to obtain a transparent solution, which is then filtered by using a polytetrafluoroethylene filter paper to obtain a transparent coating solution.

Step (2), a visible-light-transparent and ultraviolet-light-reflective flexible optical film is prepared.

The prepared solution was coated on a surface of a 50 μm PET film using a 20 μm precision wire bar, and then baked in an oven at 100° C. for 30 seconds to fully volatilize the solvent. Then, the coated PET film was cured under a xenon lamp with a power of 1.5 KW, so as to obtain a visible-light-transparent and ultraviolet-light-reflective coating. Finally, the coating according to Embodiment 1 was recoated so as to add ultraviolet light reflection (with a total thickness of the reflective layer being 6.8 μm) can be obtained, and then a UV curing layer (with a brand of UV935/hardness of 4 H) was coated on a surface of the coating, and then a protective layer with a surface hardness of 4 H was obtained after curing. After that, the other side of the PET film is coated with installation glue for adhering a layer of PET release protective film, so that a resulting visible-light-transparent and ultraviolet-light-reflective PET optical film can be obtained.

Figure 12:
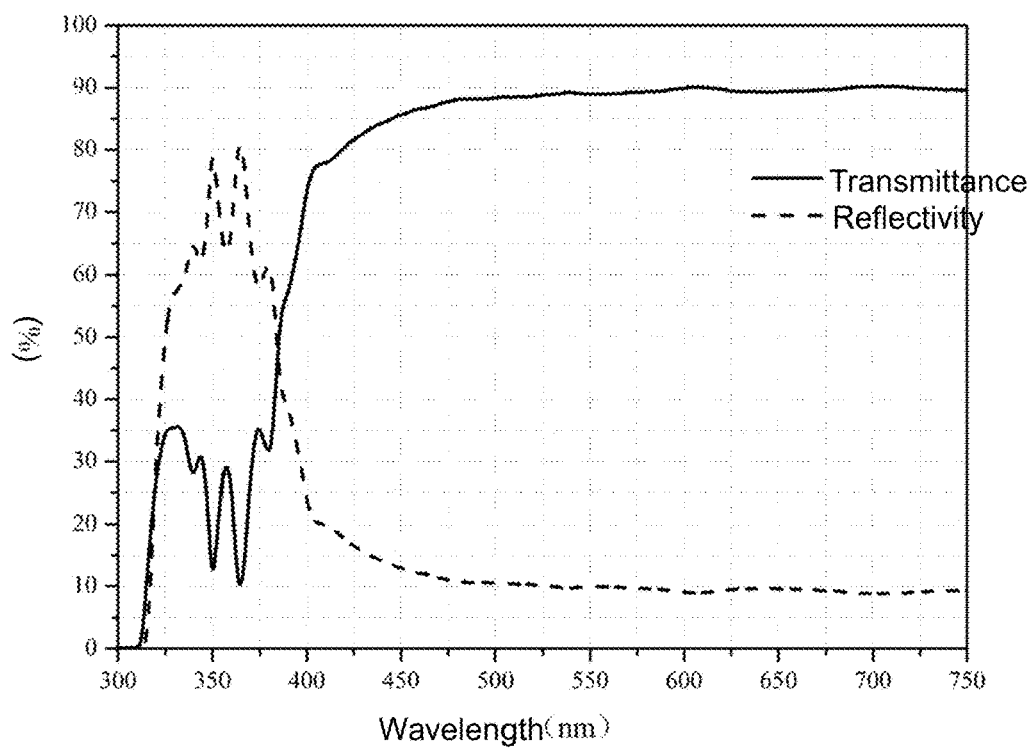

Step (3): an optical test is carried out, and an optical spectrum of the visible-light-transparent ultraviolet-light-reflective film prepared above is shown in FIG. 12.

Performance parameters of the optical films obtained in Embodiments 1 to 11 are shown in Table 3.

TABLE 3

| Embodiment | Visible Light Transmittance (%) | Visible Light Reflectivity (%) | Reflectivity for 350 to 380 nm (%) | Transmittance for 350 to 380 nm (%) | Haze Value (%) |
|---|---|---|---|---|---|
| 1 | 87.5 | 12.3 | 44.2 | 55.7 | 0.8 |
| 2 | 88.5 | 11.3 | 45.6 | 54.3 | 0.8 |
| 3 | 87.8 | 12.1 | 45.4 | 54.5 | 0.8 |
| 4 | 87.6 | 12.2 | 48.3 | 51.6 | 0.8 |
| 5 | 87.8 | 12.1 | 46.3 | 53.5 | 0.8 |
| 6 | 87.7 | 12.2 | 47.4 | 52.4 | 0.8 |
| 7 | 87.6 | 12.3 | 43.8 | 56.1 | 0.8 |
| 8 | 87.8 | 12.1 | 47.8 | 52.1 | 0.8 |
| 9 | 87.4 | 12.5 | 46.8 | 53.1 | 0.8 |
| 10 | 88.2 | 11.6 | 75.6 | 24.3 | 1.1 |
| 11 | 88.6 | 11.3 | 75.2 | 24.6 | 1.1 |

In summary, the visible-light-transparent ultraviolet-light-reflective film flexible optical film according to the disclosure has advantages of excellent optical selectivity, a simple preparation method, an innovative preparation process, easy subsequent processing and the like, and opens up a new road for practical application of the birdstrike avoidance film.

Comparative Embodiment 1

Compared with Embodiment 1, difference lies in that: firstly, an alignment layer is prepared with a commercially available polyimide solution, which is coated with a 5 μm wire bar and then dried at 120° C. for 60 seconds. A preparation process of a reflective layer is similar, and the reflectivity and haze value of the obtained optical film are worse than those of Embodiment 1, and optical leveling property of this film is also poor.

Comparative Embodiment 2

Compared with Embodiment 2, difference lies in that: firstly, an alignment layer is prepared with a commercially available polyvinyl alcohol solution, which is coated with a 5 μm wire bar and then dried at 120° C. for 60 seconds. A preparation process of a reflective layer is similar, and the reflectivity and haze value of the obtained optical film are worse than those of Embodiment 2, and optical leveling property of this film is also poor.

The comparative embodiments do not meet actual requirements for use of a window film, because the optical haze value is too large.

TABLE 4

| Comparative Embodiment | Visible Light Transmittance (%) | Visible Light Reflectivity (%) | Reflectivity for 350 to 380 nm (%) | Transmittance for 350 to 380 nm (%) | Haze Value (%) |
|---|---|---|---|---|---|
| 1 | 80.5 | 12.3 | 38.2 | 61.1 | 10.8 |
| 2 | 78.5 | 11.3 | 36.6 | 62.8 | 15.6 |

All documents mentioned in the present disclosure are incorporated by reference in this disclosure, as if each of the documents were individually incorporated by reference. In addition, it should be understood that various changes or modifications to the present disclosure can be made by those skilled in the art upon reading above teachings of the present disclosure, and these equivalent forms also fall within the scope defined by the appended claims.

The invention claimed is:

1. A birdstrike avoidance optical flexible film, wherein the film sequentially comprises from top to bottom:
   1) a protective layer;
   2) a reflective layer;
   3) a substrate layer;
   4) an adhesive layer; and
   5) a release layer;
   wherein a coating for preparing the reflective layer comprises following components:
   10 to 30 parts by weight of a polymerizable liquid crystal material,
   0.5 to 10 parts by weight of a chiral agent,
   0.2 to 2 parts by weight of a photoinitiator, and
   50 to 100 parts by weight of a solvent;
   wherein the polymerizable liquid crystal material is selected from a group consisting of a compound of formula L, a compound of formula II, or a combination thereof;

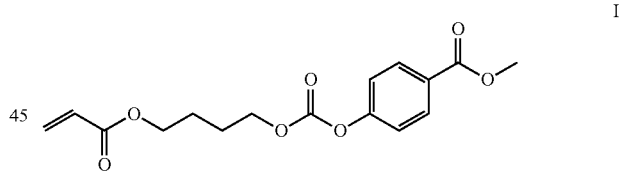

I

-continued

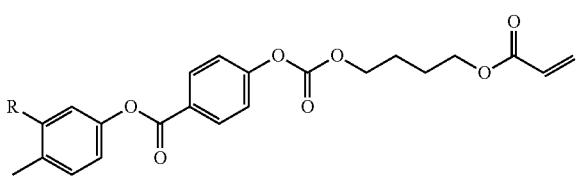

-continued

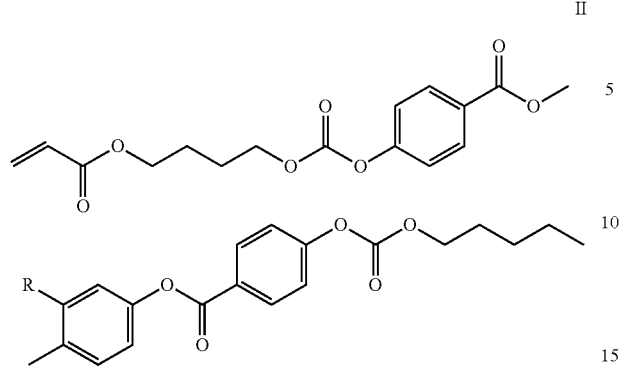

II where R is independently selected from a group consisting of $(CH_2=CH)-COO-(CH2)_m-$, halogen C1-C10 alkyl, and halogenated C1-C10 alkyl;

m is selected from a group consisting of 0, 1, 2, 3, 4, and 5;

wherein a thickness of the reflective layer is 3 to 7 μm;

wherein a total thickness of the protective layer, the reflective layer, and the substrate layer is 20 to 120 μm;

wherein the reflective layer has a structure of more than one layers of polymerizable cholesteric liquid crystal coating to make a visible light transmittance of the optical flexible film is higher than 80% and an ultraviolet light reflectivity of the optical film is higher than 60%;

wherein the more than one layers of polymerizable cholesteric liquid crystal coating is first applying and curing by a first transparent coating solution obtained by pre-dispersing and filtering a mixture with a weight ratio of 20:41.2:0.8:78 of a bifunctional polymerizable liquid crystal material with R being $CH_3$ a chiral agent, a 1173 photoinitiator, and a toluene; and then applying and curing by a second transparent coating solution obtained by pre-dispersing and filtering a mixture with a weight ratio of 20:15.6:0.8:78 of a bifunctional polymerizable liquid crystal material with R is F element, a chiral agent, a 1173 photoinitiator, and a toluene.

2. A preparation method of the film according to claim 1, comprising:
   1) providing a transparent coating for preparing the reflective layer, wherein the coating comprises following components: a polymerizable liquid crystal material, a chiral agent, a photoinitiator and a solvent, and mixing the components of the coating and dispersing at a high speed for coating and preparing the reflective layer;
   2) coating the transparent coating obtained in step 1) on the substrate layer, drying and then curing a resulting film to obtain the substrate layer coated with the reflective layer;
   3) coating the protective layer on the reflective layer of the substrate layer coated with the reflective layer obtained in step 2) to obtain a protective layer-reflective layer coated substrate layer;
   4) coating an adhesive layer on the substrate layer of the protective layer-reflective layer coated substrate layer obtained in step 3); and
   5) adhering a release layer to the adhesive layer of a product obtained in step 4) so as to obtain the optical film.

3. The method according to claim 2, wherein a temperature for the drying is 50 to 300° C.; and/or duration for the drying is 15 to 200 s.

* * * * *